United States Patent
Goldberg

(10) Patent No.: US 10,298,401 B1
(45) Date of Patent: May 21, 2019

(54) NETWORK CONTENT SEARCH SYSTEM AND METHOD

(71) Applicant: Amazon Technologies, Inc., Seattle, WA (US)

(72) Inventor: Matthew E. Goldberg, Amsterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 15/466,642

(22) Filed: Mar. 22, 2017

(51) Int. Cl.
*H04L 29/06* (2006.01)
*H04L 9/32* (2006.01)
*G06F 17/30* (2006.01)

(52) U.S. Cl.
CPC ...... *H04L 9/3239* (2013.01); *G06F 17/30997* (2013.01); *H04L 63/0227* (2013.01)

(58) Field of Classification Search
CPC .............. H04L 9/3239; H04L 63/0227; G06F 17/30997
See application file for complete search history.

(56) References Cited

U.S. PATENT DOCUMENTS

| | | | |
|---|---|---|---|
| 8,898,204 B1* | 11/2014 | Sathe | G06F 17/30 707/812 |
| 9,152,713 B1* | 10/2015 | Henzinger | G06F 17/30864 |
| 9,355,155 B1* | 5/2016 | Cassel | G06F 21/552 |
| 9,483,629 B2 | 11/2016 | Krawczyk et al. | |
| 9,971,809 B1 | 5/2018 | Tarsi et al. | |
| 2003/0115039 A1* | 6/2003 | Wang | G06F 17/271 704/4 |
| 2004/0225647 A1* | 11/2004 | Connelly | G06F 17/30864 |
| 2006/0117000 A1* | 6/2006 | Lulu | G06F 17/30967 |
| 2006/0168304 A1* | 7/2006 | Bauer | H04L 67/104 709/232 |
| 2007/0185868 A1* | 8/2007 | Roth | G06F 17/30908 |
| 2008/0033905 A1* | 2/2008 | Stokes | G06Q 10/06 |

(Continued)

OTHER PUBLICATIONS

"Create a Hashed Index," MongoDB Manual 3.0, <https://docs.mongodb.com/v3.0/tutorial/create-a-hashed-index/> [retrieved Mar. 20, 2017], 2 pages.

(Continued)

*Primary Examiner* — Ghodrat Jamshidi
(74) *Attorney, Agent, or Firm* — Davis Wright Tremaine LLP

(57) ABSTRACT

A network traffic monitoring service provides a way to search network traffic intercepted by a network firewall while protecting the privacy of non-matching network traffic that traverses the firewall. Network traffic is parsed and processed into a set of tokens. In various implementations, the tokens may be words, HTML tags, data values, or other searchable units of information. The tokens are converted into a set of hashes, and the set of hashes is provided to the traffic monitoring service. A search authority submits a search request to the traffic monitoring service. Search terms of the search request are converted to a set of hashes to produce a hashed search request. The traffic monitoring service processes the hashed search request against the set of hashes provided by the network firewall to determine whether the network traffic represented by the set of hashes matches the search request.

20 Claims, 16 Drawing Sheets

(56) References Cited

U.S. PATENT DOCUMENTS

| | | | |
|---|---|---|---|
| 2008/0168135 A1* | 7/2008 | Redlich | G06Q 10/10 |
| | | | 709/204 |
| 2009/0300770 A1* | 12/2009 | Rowney | G06F 17/30516 |
| | | | 726/26 |
| 2010/0023514 A1 | 1/2010 | Parikh | |
| 2014/0032536 A1* | 1/2014 | Agrawal | G06F 17/30616 |
| | | | 707/723 |
| 2014/0281850 A1* | 9/2014 | Prakash | G06F 17/218 |
| | | | 715/202 |
| 2016/0253521 A1 | 9/2016 | Esmailzadeh et al. | |
| 2017/0046395 A1* | 2/2017 | Li | G06F 17/3033 |

OTHER PUBLICATIONS

"Text Processing: A Simple Spelling Checker," Open Book Project, <http://openbookproject.net/py4fun/spellCheck/index.html> [retrieved Mar. 20, 2017], 5 pages.

"Tokenization (Lexical Analysis)," Wikipedia, The Free Encylopedia, Jan. 10, 2017, <https://en.wikipedia.org/wiki/Tokenization_(lexical_analysis)> [retrieved Mar. 20, 2017], 2 pages.

* cited by examiner

NETWORK CONTENT SEARCH SYSTEM AND METHOD

CROSS-REFERENCE TO RELATED APPLICATION

This application incorporates by reference for all purposes the full disclosure of co-pending U.S. patent application Ser. No. 15/466,630, filed Mar. 22, 2017, entitled "PROTECTED SEARCH INDEX."

BACKGROUND

Online services are an important part of modern computing infrastructure. Rather than providing hardware, software, and support for commonly used computer services, customers increasingly rely on online service providers to provide common computing services. When an online service provider provides a computing service that has access to sensitive business information from multiple customers, protecting each customer's sensitive business information becomes a difficult problem for the service provider. For example, if an online service provider provides an email service to a plurality of customers, some of which may be in competition with each other, each individual customer will demand assurances that their email is isolated from other customers. Failure to provide adequate assurances that each customer's data is protected may undermine customer confidence in the services provided by the service provider. Therefore, maintaining adequate protections for customer data is an important problem for the service provider.

BRIEF DESCRIPTION OF THE DRAWINGS

Various techniques will be described with reference to the drawings, in which.

DETAILED DESCRIPTION

Figure 1:
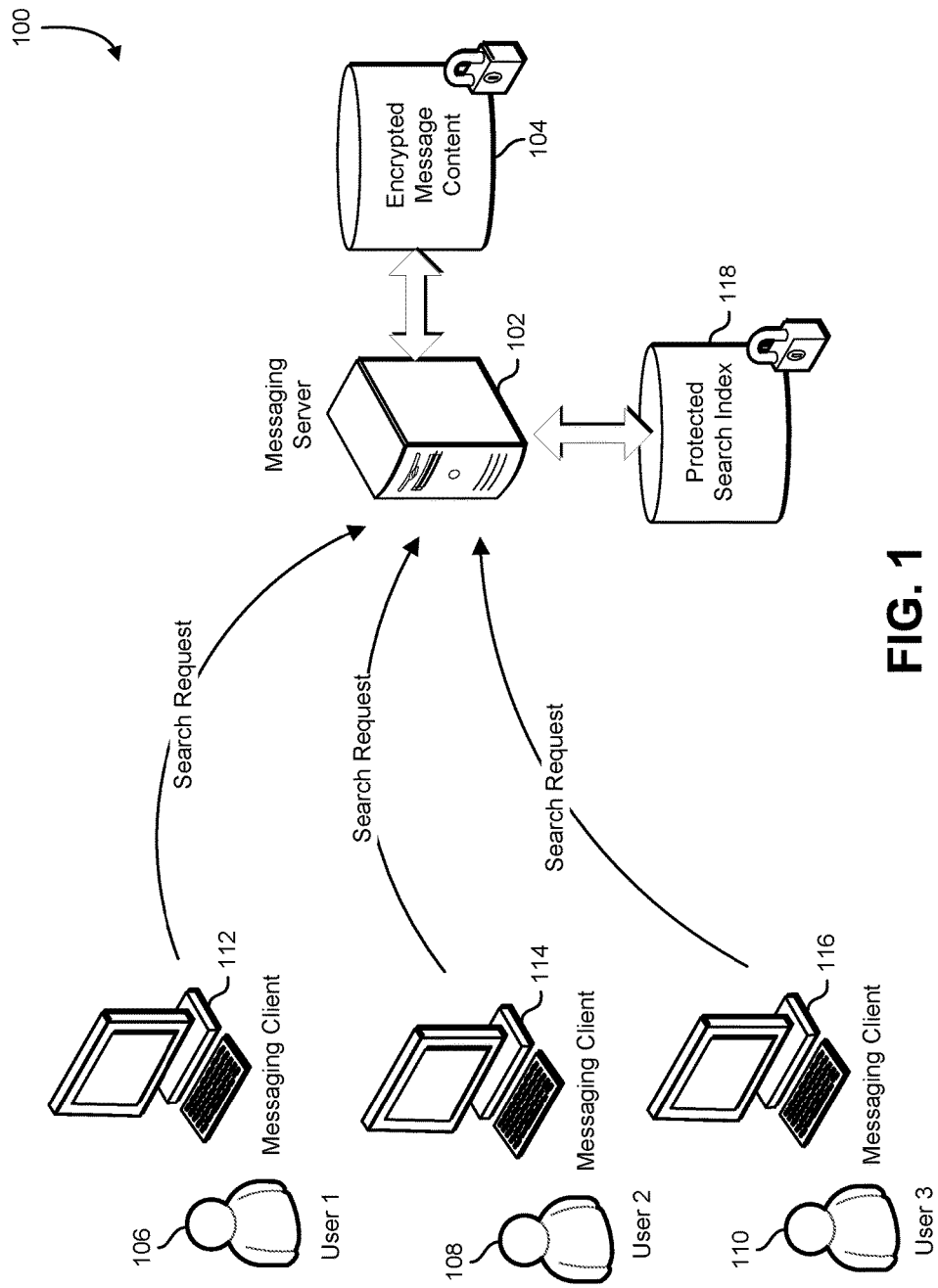
FIG. 1 shows an illustrative example of an environment in which various embodiments may be practiced.

The present document describes systems and methods that enable efficient searching of customer information in a service provider environment while protecting the customer information being searched. In some examples, a service provider provides a messaging service that retains messages owned by a variety of different customers, and each individual customer maintains a cryptographic key with which the individual customer's messages may be encrypted. In various examples, the messaging service may be an email service, an instant messaging service, a chat room service, or a video conferencing service. In some implementations the methods described in this document may be applied to a document sharing service, a source code management service, a Web content management service, or content management service. To facilitate efficient searching, the service provider creates and maintains an index of the retained messages. In some examples, an index is created for each individual customer. The index is maintained in a way that protects the contents of the associated customer's messages if the index becomes accessible to an attacker.

To generate the index for a particular customer, each message belonging to the particular customer is tokenized and processed. In general, tokenization involves breaking a message down into a number of words or phrases. In some examples, a token may represent a phrase, language element, file component, or other parse-able portion of a message. In another example, a token may represent a normalized version of a word, phrase, language element, file component, or parse-able message portion. Normalization may be accomplished, for example, by standardizing the case of the characters in a word, or by expanding abbreviated words or phrases in a document. A particular document may include some document portions that are neither parsed as tokens nor used as delimiters. The tokens of a message are converted to values based on a token map. In some examples, the token map is created by generating a dictionary of tokens that are present in the particular customer's messages to random values. In other examples, values are created by generating a cryptographic hash, message authentication code ("MAC"), or hashed message authentication code ("HMAC") for each token present in the particular customer's messages. The processed messages belonging to a particular customer are processed to generate a search index linking values to messages, and the index is retained by the service provider. In various examples, the index may be stored as a binary tree, hash table, hash tree, ordered list, or other structure that enables rapid searching.

When a search request is submitted, the service provider converts the search terms in the search request to tokens in accordance with the method used to generate the index, and searches for the tokens using the index. In one implementation, for each search term, the service provider acquires a list of messages containing the term. The lists of messages are processed according to logic included in the search request. For example, if a search request specifies that messages containing all of the terms are to be returned, the service provider determines a set of documents that satisfies the search request by identifying messages present in all of the message lists. After determining the final set of messages that satisfy the search request, the service provider identifies the final set of messages to the requester. In many implementations, the requester may access the plain text of the final set of messages if the requester has access to appropriate cryptographic keys used to protect the messages.

In some examples, the system may be used to provide search services to third parties without revealing specific document knowledge. In one implementation, the system generates a search index for documents in the messaging service for use by a searching authority. For each document, the messaging service generates a doc-user hash based on an associated user ID and document ID of the document. The messaging service records the doc-user hash in a database in association with the user ID and the document ID. As each document is processed by the messaging service, the messaging service coverts the document to a stream of tokens. The stream of tokens is hashed to produce a stream of hashes. The stream of hashes and the associated doc-user hash are stored in an index that may be used by a search authority to determine whether documents matching a particular set of search terms and parameters are present in the messaging service without revealing the specific contents of each document, the document ID, or the user ID of matching documents.

When the search authority submits a search for the messaging service, the messaging service receives a set of search terms and parameters from the search authority and converts the search terms to tokens. The tokens are hashed using an algorithm that matches the algorithm used to generate the index. In some examples, the matching algorithm is the same algorithm. Using the index, the messaging service identifies a set of doc-user hashes that are associated with documents that satisfy the search terms in accordance with the search parameters. The parameters of the search include the connective logic between the terms of the search. For example, if the search authority submits a search to find terms A and B, the messaging service generates hashes for the terms A and B, and identifies doc-user hashes that are associated with both the hash of A and the hash of B.

After identifying a set of doc-user hashes, the search authority may submit the doc-user hashes to the messaging service. The messaging service may, at its option, identify some, all, or none of the document IDs and user IDs associated with the set of doc-user hashes. For example, an advertiser may perform a search on terms associated with the product in order to identify customers for targeted advertising. The advertiser would receive a set of doc-user hashes and would know how many messages matched the provided search terms, but would be unable to identify the users, the documents, or the contents of the messages that were searched. In exchange for a fee, the messaging service could provide contact information for some or all of the users identified by the set of doc-user hashes. In this implementation, the search is specified, performed, and the results provided without revealing the full plaintext content of user documents.

In another example, the system may be used to monitor network traffic according to predetermined policies without viewing plaintext traffic that is not in violation of those policies. In one implementation, a firewall server monitors network traffic between an internal network and the Internet. The firewall server maintains a database of logical network connections, and generates a user-connection hash based on a user ID and a connection ID associated with each connection. Traffic over each connection is tokenized, and the resulting tokens are hashed. The resulting hashes are provided to a traffic monitoring agent along with the associated user-connection hash.

An administrator submits searches to the traffic monitoring agent. Each search includes one or more search terms and optional search parameters that define the relationships between the search terms. The traffic monitoring agent hashes the search terms and stores the hashed searches in a hash database on the traffic monitoring agent. As hashes are received from the firewall server, the traffic monitoring agent processes the hashes and determines whether the hashes satisfy any of the searches submitted by the administrator. If a search is satisfied, the traffic monitoring agent notifies the administrator and records the user-connection hash of the connection that satisfies the search. The user-connection hash may be submitted to the firewall server to identify the user associated with the user-connection hash.

FIG. 1 shows an illustrative example of an environment in which various embodiments may be practiced. A system diagram 100 shows a messaging server 102 that maintains an encrypted message database 104. In some implementations, the messaging server 102 is an email server serving multiple customers and users. In another implementation the messaging server 102 is an instant messaging server. In yet another implementation, the messaging server is a text messaging router in a cellular network. The encrypted message database 104 may be a storage system within the messaging server 102 or an external storage system outside of but accessible to the messaging server 102. The message database 104 retains email, text messages, documents, or other messages handled by the messaging server 102 in a protected format. In some implementations, the message database 104 retains messages in an encrypted format. In some implementations, the messages are encrypted with symmetric cryptography using various symmetric algorithms such as blowfish, DES, RC4, Mars, Triple-DES, RC2, or Serpent. In other implementations, the messages are encrypted with asymmetric cryptography using asymmetric algorithms such as RSA, XTR, or ECDSA.

The messaging server 102 may be accessed by a number of users. In the example shown in FIG. 1, a first user 106, a second user 108, and a third user 110 access the messaging server 102 via a first messaging client 112, a second messaging client 114, and a third messaging client 116. Each of the messaging clients may be a personal computer system, a laptop computer system, a cell phone, a mobile device, a tablet computer, or other messaging device capable of communicating with the messaging server 102. In some examples, the users are users within a particular company, and the company acquires messaging services from the messaging server 102. In other examples, the users are different users from different companies, and each of the different companies acquires messaging services from the messaging server. Each of the users maintains a cryptographic key that is used to secure the encrypted message content stored in the message database 104.

The messaging server 102 provides search capabilities to each of the users by generating and maintaining a protected search index 118. In various examples, the protected search index may be a binary tree, ordered list, hash table, relational database, or other structure arranged to provide improved search performance. The protected search index 118 is generated from the messages contained in the message database 104. To generate the index, the messaging server 102 tokenizes the plaintext version of each message to produce a set of tokens. Each message is tokenized by dividing the message into a collection of words or character sequences that are separated by any of an identified set of delimiter characters. In many implementations, the set of delimiter characters includes whitespace, punctuation, and non-printable characters such as carriage returns and line feeds. For example, if the present paragraph were tokenized, the resulting set of tokens would be the words in this paragraph. Each token in the set of tokens is converted to a corresponding value. In some implementations, the value is a hash. In other implementations, the value is a cryptographic hash. In yet another implementation, the value is a message authentication code. In yet another implementation, the value is a random value defined in a token-to-value dictionary. Each value in the resulting set of values is stored in the protected search index 118 in association with a document identifier. The document identifier may be a document name, a file handle, or hash based on the document name or file handle. In general, it is not practical for an attacker to re-create a particular plaintext document given access to the protected search index 118.

The protected search index 118 allows the messaging server 102 to provide efficient search capabilities to users of the messaging server 102. When a particular user submits the search request to the messaging server 102, the messaging server 102 converts the terms of the search request to values using a cryptographic hash or other method corresponding to the conversion algorithm used when generating the protected search index 118. The resulting values of the search request correspond to the values in the protected search index 118. The messaging server 102 then uses the protected search index 118 to identify a set of document identifiers that contain values matching the search terms. Search parameters such as logic between terms can be applied to further refine the set of document identifiers that satisfy the search. In some implementations, the protected search index 118 includes separate search indexes for each user or separate search indexes for each customer of the messaging server 102. The messaging server 102 identifies the documents associated with the document identifiers, and returns those documents to which the particular user is allowed to have access.

Figure 2:
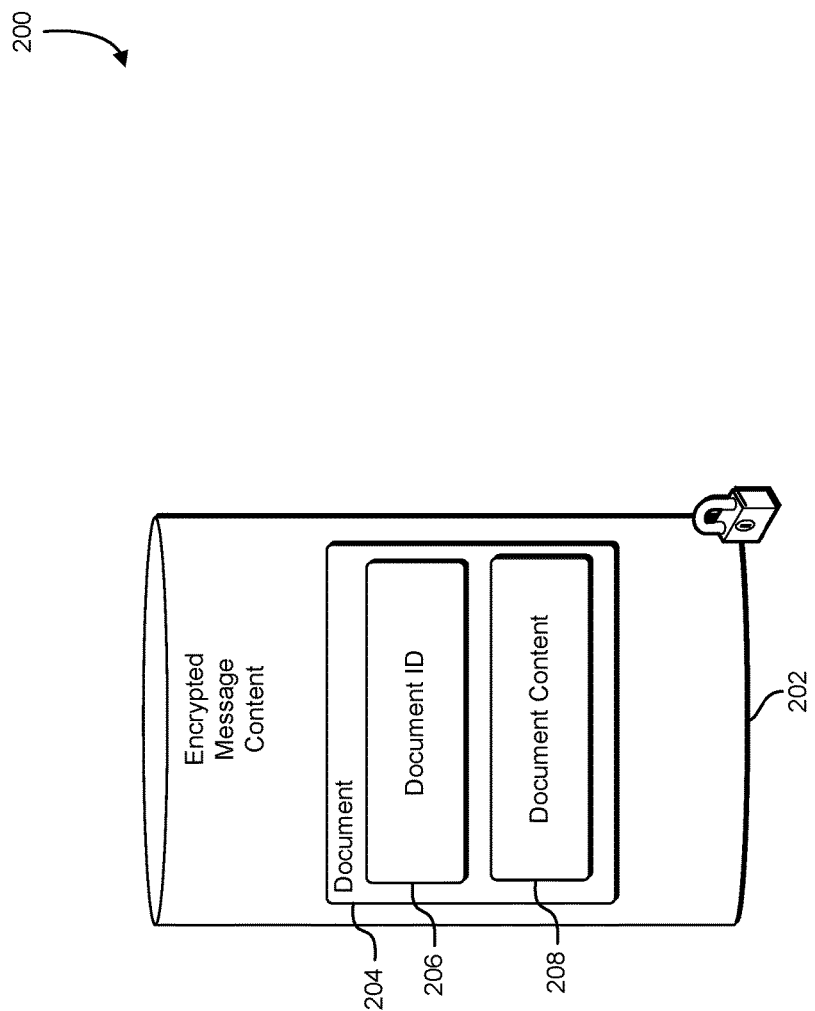
FIG. 2 shows an illustrative example of a data store that retains encrypted email content.

FIG. 2 shows an illustrative example of a data store that retains encrypted user documents. A diagram 200 shows a message database 202 that holds documents managed by a messaging service. In various examples, the documents may be emails, instant messages, video messages, text messages, audio messages, or other documents shared between users of the messaging service. The message database 202 holds a number of documents. A particular document 204 has an associated document ID 206 and associated document content 208. The particular document 204 may be an email, an electronic message, a text message, a video clip, or other document transmitted between users of the messaging service. For a specific document, the document ID may be a message identifier, file handle, file name, storage address, or file ID that allows the messaging service to identify and access the specific document. The document content 208 holds message content associated with the specific document. For example, for an email document, the document content 208 may include the text that is the body of the email.

In various implementations, the document content 208 is protected from general viewing by encryption. Each user maintains a cryptographic key that is used to encrypt the document content 208 and prevent entities that do not have the cryptographic key from accessing the document content 208. The cryptographic key may be retained in a storage device under the control of the user, in a hardware security module ("HSM"), or online key manager. In various implementations, the messaging service is allowed to use the cryptographic key to encrypt and decrypt documents on behalf of the owner of the cryptographic key. If the owner of the cryptographic key revokes access to the cryptographic key, the encrypted documents become inaccessible.

In some implementations, the messaging service maintains a plaintext search index for the documents maintained in the message database 202. The plaintext content of each document is tokenized into a set of plaintext words. The plaintext words are placed into a searchable index such as a binary tree, hash table, or an ordered list. When a user submits a search, the messaging service parses the words from the search and uses the index to locate the documents containing the desired terms. If the user revokes access to the cryptographic key, the messaging service may take steps to protect the index. In some examples, the hashes of the tokens in the index are produced using an HMAC, and the HMAC is generated using the user's cryptographic key thereby rendering the index useless once access to the user's key has been revoked. In some implementations, the index is encrypted using the user's cryptographic key before the key is revoked. In another implementation, the index is deleted when access to the key is revoked and re-created if access to the user's cryptographic key is restored.

Figure 3:
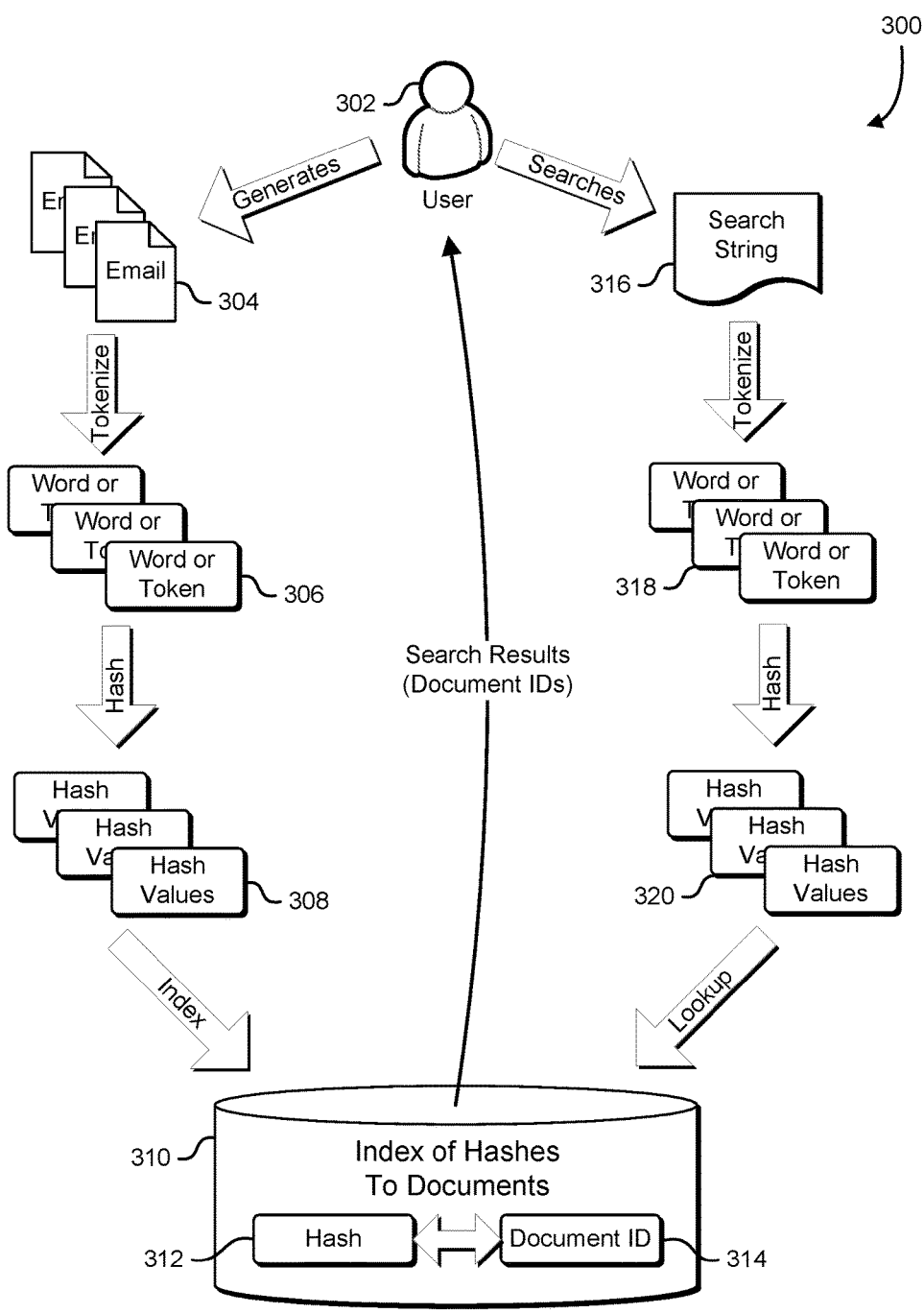
FIG. 3 shows an illustrative example of a process where a messaging service creates a protected index of documents and uses the index to perform searches that are submitted by the user.

FIG. 3 shows an illustrative example of a process where a messaging service creates a protected index of documents and uses the index to perform searches that are submitted by the user. A diagram 300 shows two processes initiated by a user 302 that are performed by a messaging service.

In one process, the user 302 generates a document 304 such as an email document in the messaging service. The document 304 may be generated by composing an email, receiving an email, sending a text message, receiving a video message, or sending an instant message over the messaging service. The messaging service processes the document 304 to produce a set of tokens 306. In some examples, the set of tokens 306 is a set of words. In some implementations, the messaging service produces the set of tokens 306 through a process of tokenization. In the present document, tokenization refers to the process of dividing a stream of data into words, phrases, or other meaningful elements called tokens. In some examples, tokenization is accomplished by dividing a stream of text into sequences of printable characters that are separated by whitespace, punctuation and nonprintable characters.

After extracting the set of tokens 306 from the document 304, the messaging service converts each token into an associated value such as a hash value. In some implementations, the messaging service generates a dictionary by assigning a random value to each token. In another implementation, the messaging service generates a hash value for each token. In yet another implementation, the messaging service generates a cryptographic hash of each token as the associated value. In the example shown in FIG. 3, the associated value for each token is a hash of the value of the token. The resulting set of hashes 308 is stored in a protected index 310 in association with information that allows the messaging service to identify the document 304. In some implementations, a document ID is generated for each document, and each hash 312 is stored in association with a corresponding document ID 314. In another implementation, the document 304 is embedded into the protected index 310, and the document ID 314 may be a pointer to the document 304. The hash 312 and the corresponding document ID 314 comprise a hash-document ID pair. The hash-document ID pairs may be arranged in a data structure that facilitates efficient searching. In some examples, the hash-document ID pairs are arranged in a binary tree. In another example, the hash-document ID pairs are arranged in an ordered list. In yet another example, the hash-document ID pairs are arranged in a hash table. In yet another example, the hash-document ID pairs are stored in a relational database. In some examples, a single instance of the protected index 310 may include hashes generated from multiple types of documents. For example, email, chat log, and Web content documents may be tokenized, hashed, and stored in a single index.

In a second process, the user 302 submits a search to the messaging service in the form of the search string 316. The search string 316 is comprised of one or more search terms and search parameters that provide connective logic between the one or more search terms. For example, the search string 316 may be "A or B and C." The terms of the search string are "A," "B," and "C," and the parameters of the search string are "or" and "and." The messaging service tokenizes the terms of the search string to produce a set of tokenized terms 318. The search parameters and the relationships between the search terms specified by those parameters are preserved. The messaging service then generates a value 320 for each tokenized term 318. The value 320 may be generated using a dictionary, a hash function, a cryptographic hash, or other method that matches the method used to generate the resulting set of hashes 308. In the example shown in FIG. 3, the value 320 is a hash value. Since matching methods are used to generate the values in the protected index 310 and the values 320, the protected index 310 may be used to locate documents that match the submitted search string 316. The messaging service uses the protected index 310 and the values 320 to identify sets of documents matching each of the terms of the search string 316 submitted by the user 302. The parameters of the search are applied to each of the sets of documents to produce a final set of document IDs that satisfy the search string 316. For example, if the search string is "A and B," the messaging service finds the set of document IDs containing term "A" and the set of document IDs containing term "B," and then finds the intersection of the two sets of document IDs to produce the final set of document IDs that satisfies the search string 316.

In some implementations, the hashes 308 and the values 320 are generated using a cryptographically secure hash function. If the user revokes access to a cryptographic key used to store the documents 304, the protected index 310 is not deleted or encrypted since the protected index 310 may not be easily used to re-create the content of the documents 304. In another implementation, the hashes 308 and the values 320 are generated using an HMAC that uses the cryptographic key. When access to the cryptographic key is revoked, the index becomes unusable because additional searches cannot be hashed to be compatible with the index.

Figure 4:
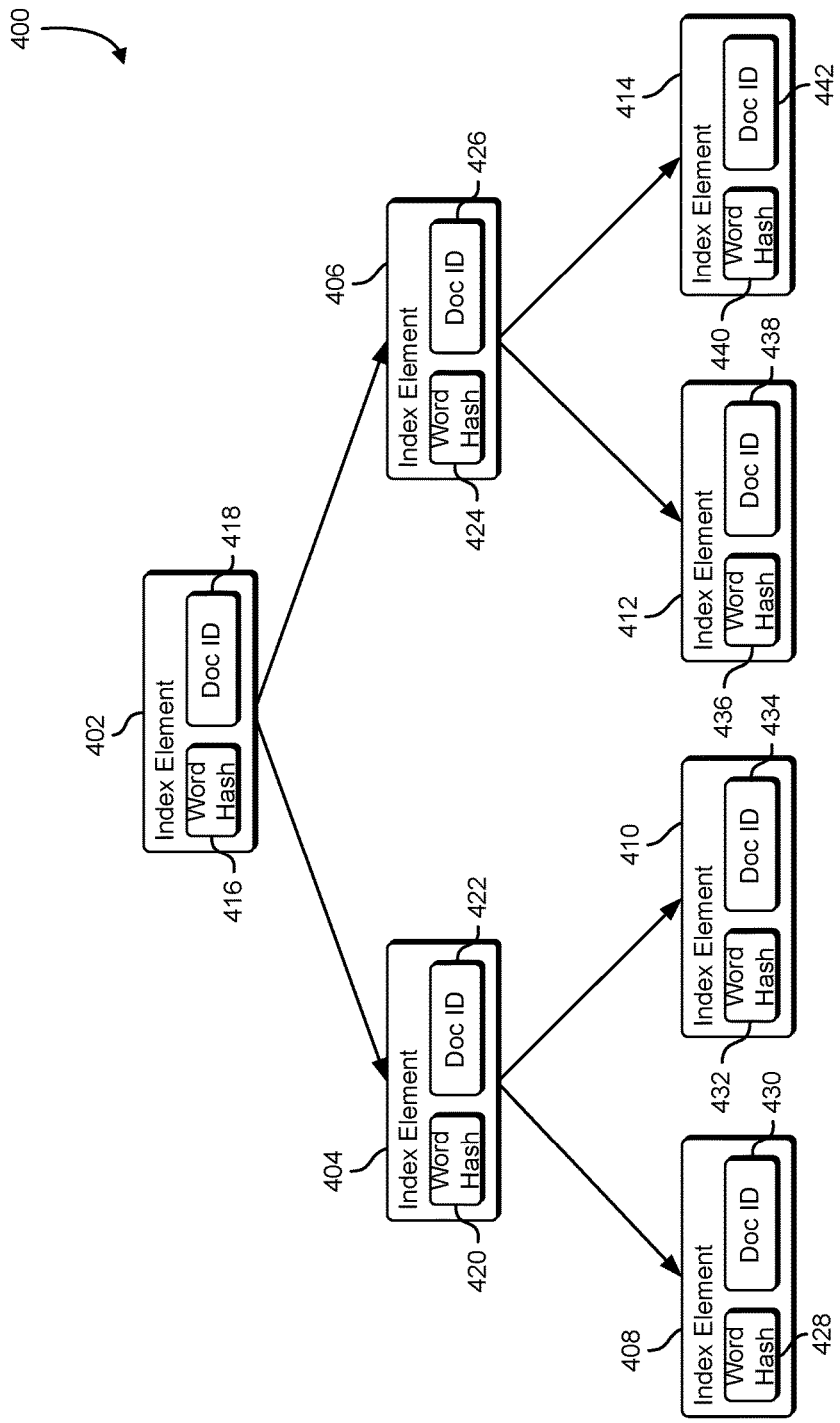
FIG. 4 shows an illustrative example of a protected index that enables searches on a set of documents.

FIG. 4 shows an illustrative example of a protected index that enables searches on a set of documents. A data diagram 400 illustrates a protected index that is arranged in a tree structure. The tree structure includes a set of index elements arranged in a binary tree. A root node index element 402 is linked to a first intermediate node index element 404 and a second intermediate node index element 406. The first intermediate node index element 404 is linked to a first leaf node index element 408 and a second leaf node index element 410. The second intermediate node index element 406 is linked to a third leaf node index element 412 and a fourth leaf node index element 414.

Each index element in the tree structure includes a word hash and a document ID. In some implementations, the word hash is a value linked to a particular word or token via a dictionary maintained by the messaging service. In other implementations, the word hash is a cryptographic hash generated from a particular word or token. The document ID may be an identifier assigned by the messaging service to each document such as a storage address, filename, or file pointer. The root node index element 402 includes a root word hash 416 and a root document ID 418. The first intermediate node index element 404 includes a first intermediate hash 420 and a first intermediate document ID 422. The second intermediate node index element 406 includes a second intermediate word hash 424 and a second intermediate document ID 426. The first leaf node index element 408 includes a first leaf word hash 428 and a first leaf document ID 430. The second leaf node index element 410 includes a second leaf word hash 432 and a second leaf document ID 434. The third leaf node index element 412 includes a third leaf word hash 436 third leaf document ID 438. The fourth leaf node index element 414 includes a fourth leaf word hash 440 fourth leaf document ID 442.

The word hashes of the index elements are used as keys when ordering the index elements in the tree structure. When a search is submitted by a user of the messaging service, the terms of the search are converted to hash values that correspond to the various word hashes of the index elements in the protected index. For each hash of each search term, the messaging service traverses the tree structure starting at the root node index element 402 and proceeds down the tree until either all matching word hashes are found within the tree structure, or the messaging service determines that the hash is not present in the tree structure. In some implementations, a particular word hash may be present in multiple index element nodes. In other implementations, the document IDs in each index element may identify a single document or a plurality of documents. By searching the index, the messaging service is able to identify the set of documents containing the search term. The set of documents may include zero or more documents.

Figure 5:
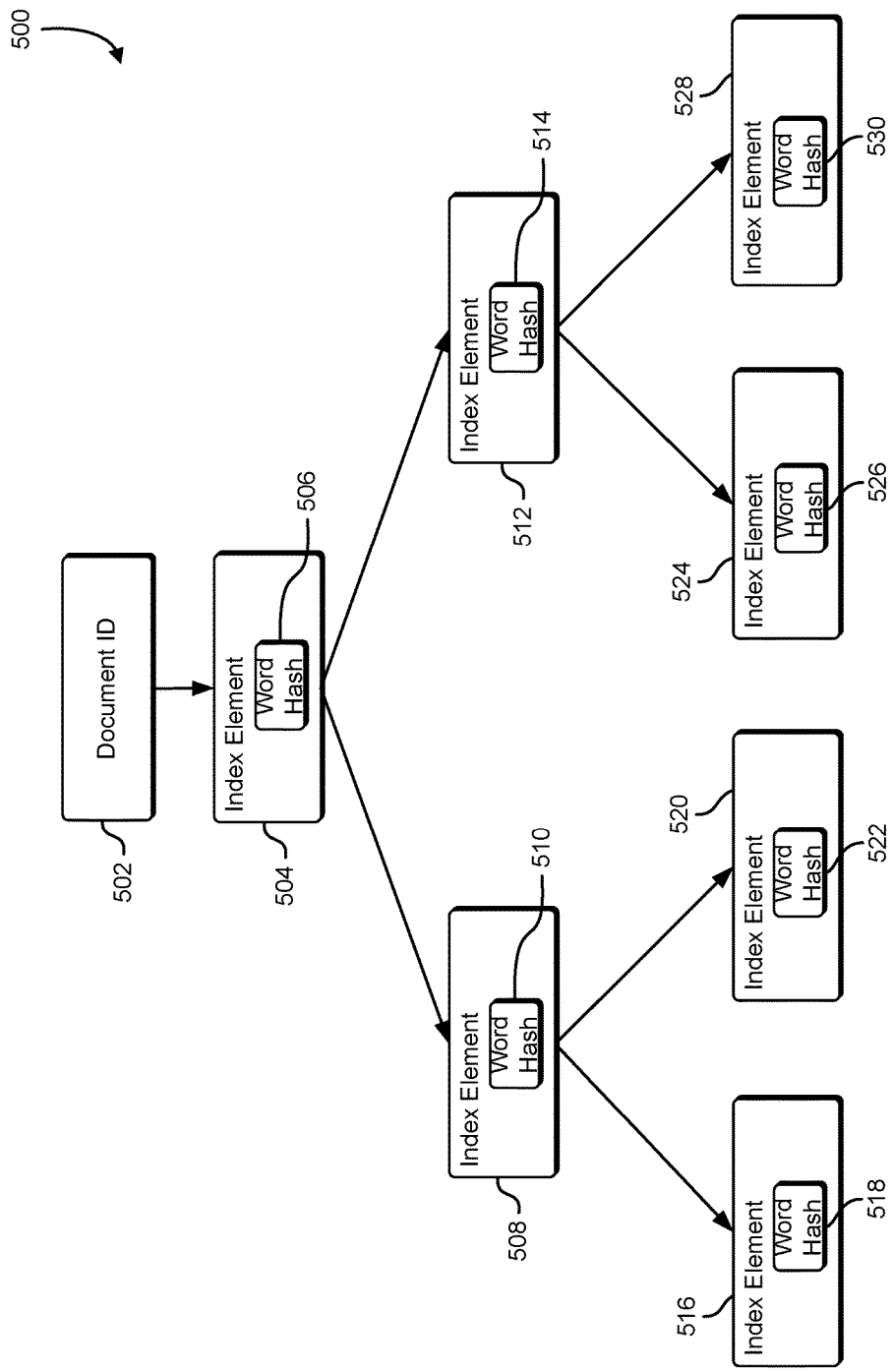
FIG. 5 shows an illustrative example of a protected index that enables searches on a particular document.

FIG. 5 shows an illustrative example of a protected index that enables searches on a particular document. In some implementations, the messaging service generates a protected index for each document managed by the service. A data diagram 500 illustrates a structure of a protected index for a particular document. A document record 502 holds a document ID associated with the particular document. The document ID may be a filename, file handle, storage address, URL, or other information that identifies a particular document. The document record 502 contains a link to a tree structure that holds the protected index. The protected index includes a root node index element 504 that includes a root node hash 506. The root node index element 504 references to intermediate nodes: a first intermediate index element 508 having a first intermediate node hash 510, and a second intermediate index element 512 having a second intermediate node hash 514. The first intermediate index element 508 references a first leaf index element 516 having a first leaf hash 518, and a second leaf index element 520 having a second leaf hash 522. The second intermediate index element 512 references a third leaf index element 524 having a third leaf hash 526 and a fourth leaf index element 528 having a fourth leaf hash 530.

When a user submits a search request to the messaging service, the messaging service determines the set of documents that the user is allowed to search, and searches the protected indexes corresponding to the set of documents to determine whether any of the terms of the search are present in each document. The final set of documents that satisfies the search request is determined in accordance with the parameters of the search request and provided to the user.

Figure 6:
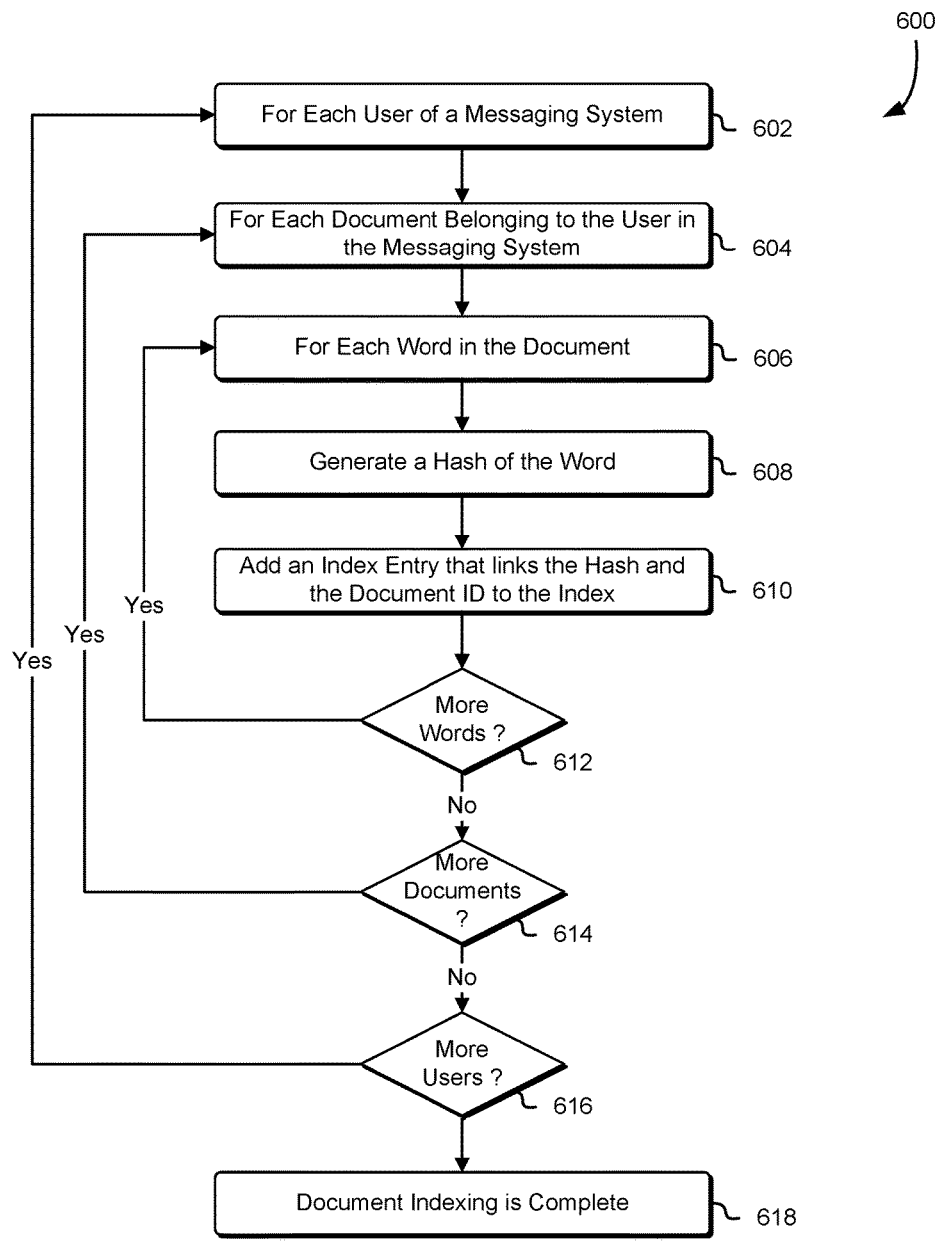
FIG. 6 shows an illustrative example of a process that, as a result of being performed by a messaging service, generates a protected index for a set of documents.

FIG. 6 shows an illustrative example of a process that, as a result of being performed by a messaging service, generates a protected index for a set of documents. A flowchart 600 illustrates a process that begins at block 602 with the messaging service initiating a set of nested loops. At block 602, the messaging service iterates over each user of the messaging service. For each iterated user, the messaging service iterates 604 over each document belonging to the iterated user. In various examples, documents belonging to the iterated user may include messages sent, messages received, and draft messages composed but neither sent nor received. At block 606, the messaging service iterates over each word in the iterated document. In some implementations, the messaging service tokenizes the iterated document and iterates over each token.

The messaging service processes each token to produce a protected index. At block 608, the messaging service generates a value to represent the token. In some examples, the value is a cryptographic hash of the token. In another example, the value is a randomly generated value that is placed in a dictionary of values to tokens, and the dictionary is stored and maintained by the messaging service. In yet another example, the value is a hash of the token. At block 610, the messaging service searches through the existing protected index to see if the value is present in the index. In some implementations, if the value is present in the index, the messaging service modifies the node containing the value to add a document ID of the iterated document to the node. In another implementation, the messaging service generates a new node containing the value and the document ID of the iterated document and adds the new node to the index.

At decision block 612, the messaging service determines whether there are more words to be processed in the currently iterated document. If there are more words to be processed in the currently iterated document, execution returns to block 606 and the next word in the document is processed. If there are not more words to be processed in the currently iterated document, execution advances to decision block 614. At decision block 614, the messaging service determines whether there are additional documents to be processed. If there are additional documents to be processed, execution returns to block 604 and the next document belonging to the iterated user is processed. If there are not additional documents to be processed, execution advances to decision block 616. At decision block 616, the messaging service determines whether there are more users of the messaging system to be processed. If there are more users of the messaging system to be processed, execution returns to block 602 and documents belonging to the next user of the messaging service are processed. If all users of the messaging service have been processed, execution advances to block 618.

At block 618, generation of the protected index is complete. The protected index is retained by the messaging service for use in improving search performance.

Figure 7:
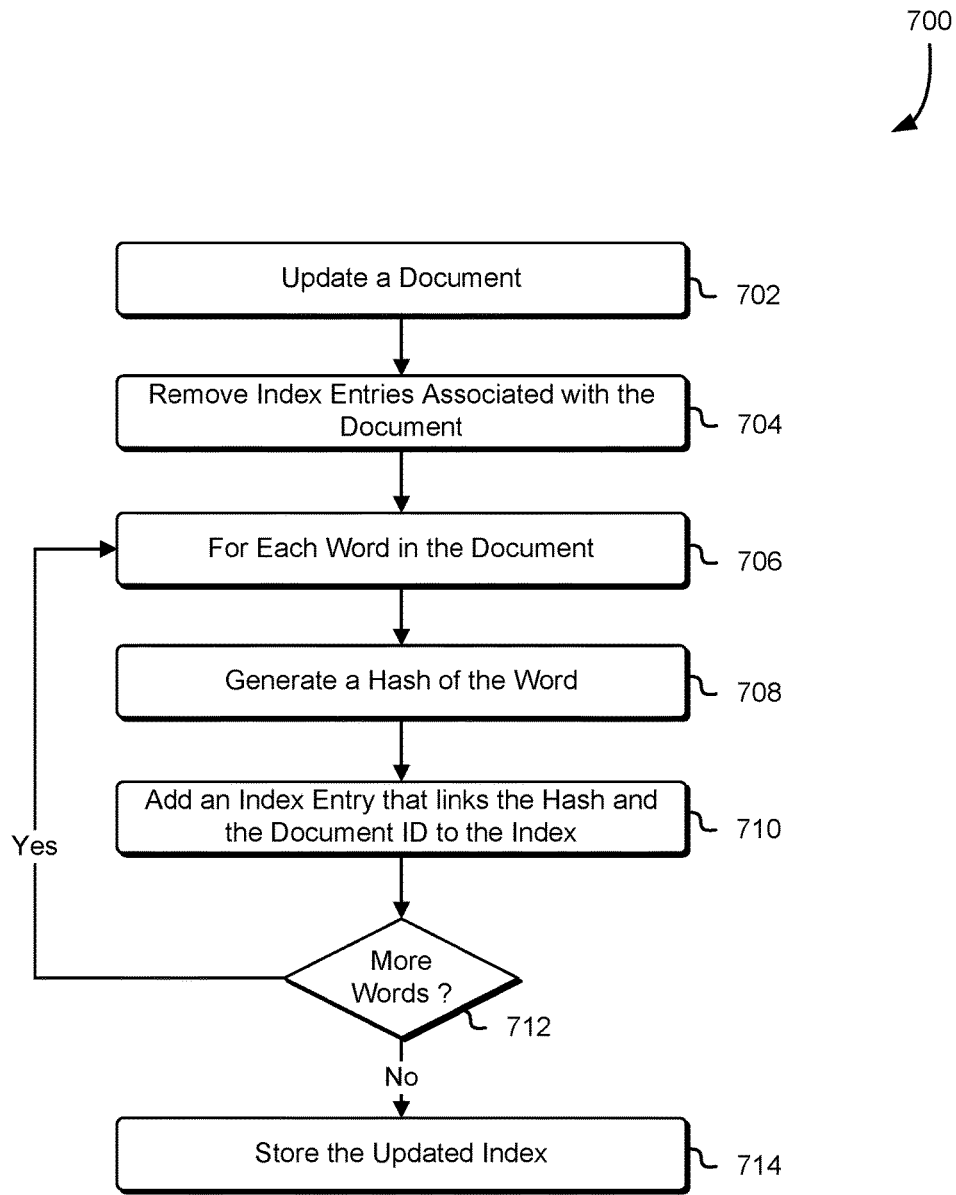
FIG. 7 shows an illustrative example of a process that, as a result of being performed by a messaging service, updates a protected index in response to a change to a previously indexed document.

FIG. 7 shows an illustrative example of a process that, as a result of being performed by a messaging service, updates a protected index in response to a change to a previously indexed document. A flowchart 700 illustrates a process that begins at block 702 with a user updating a document maintained by a messaging service. In some examples, the document may be updated as a result of the user receiving an updated message from another user of the messaging service. In another example, the document may be updated as a result of the user editing a message that is retained by the messaging service for the user. At block 704, the messaging service retrieves a document ID of the updated document and searches the protected index for entries matching the document ID. The messaging service removes, from the protected index, entries matching the document ID.

At block 706, the messaging service initiates a loop that iterates over each word in the updated document. In some implementations, the messaging service tokenizes the updated document and iterates over each token in the updated document. In many examples, the tokens are the words in the updated document. At block 708, the messaging service generates a value for the iterated word. In some implementations, the value is a randomly generated value maintained in a dictionary by the messaging service and stored in association with the document identifier. In another implementation, the value is a hash of the iterated word. In yet another implementation, the value is a cryptographic hash of the iterated word. In yet another implementation, the value is a message authentication code of the iterated word. At block 710, the messaging service generates a new index entry that links the value and the document ID and adds the new index entry to the protected index.

At decision block 712, the messaging service determines whether there are more words to process in the updated document. If there are more words to process the updated document, execution returns to block 706 and the next word in the document is processed. If there are not more words in the updated document to process, execution advances to block 714. At block 714, the protected index has been updated in accordance with the updated document, and the updated protected index is stored by the messaging service.

Figure 8:
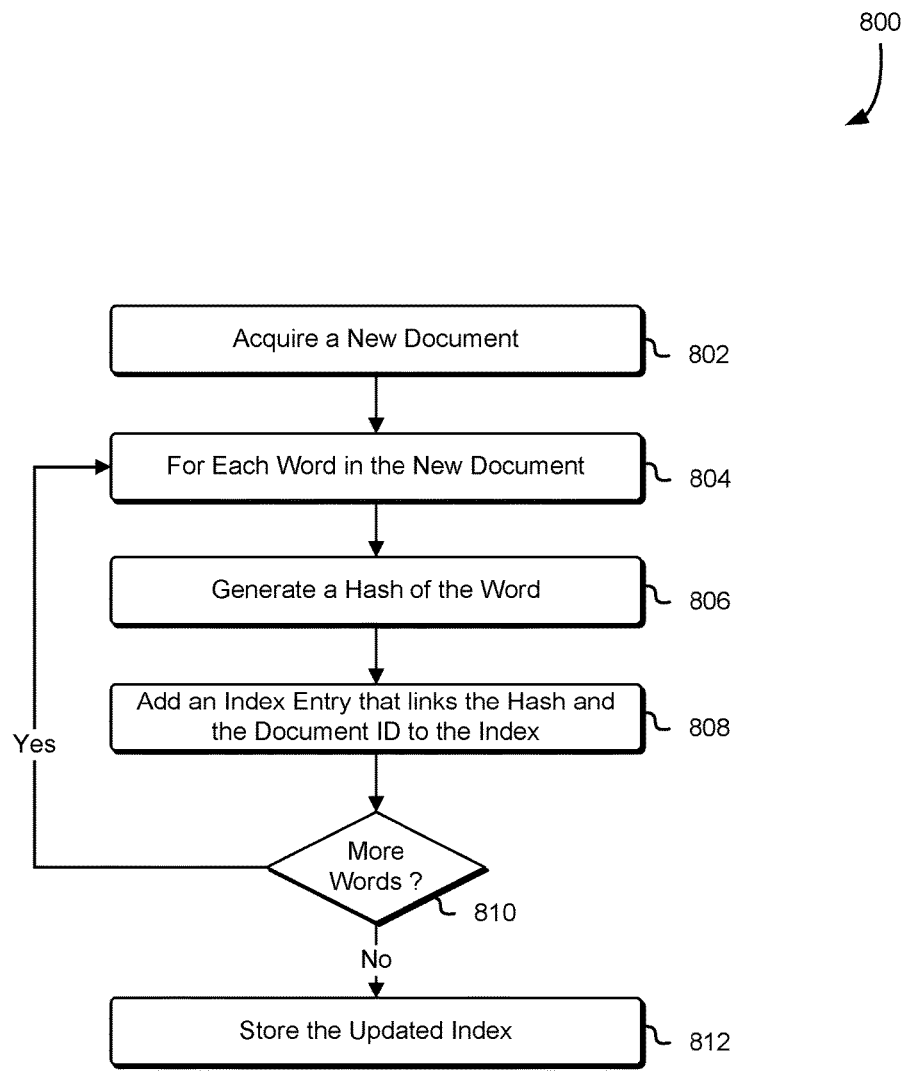
FIG. 8 shows an illustrative example of a process that, as a result of being performed by a messaging service, updates a protected index in response to the addition of a new document.

FIG. 8 shows an illustrative example of a process that, as a result of being performed by a messaging service, updates a protected index in response to the addition of a new document. A flowchart 800 illustrates a process that begins at block 802 with a new document a messaging service. In some examples, the new document may be generated by a user of the system. In another example, the new document may be a new message received by a user of the system.

At block 804, the messaging service initiates a loop that iterates over each word in the new document. In some implementations, the messaging service tokenizes the new document and iterates over each token in the new document. In many examples, the tokens are the words in the new document. At block 806, the messaging service generates a value for the iterated word. In some implementations, the value is a randomly generated value maintained in a dictionary by the messaging service and stored in association with the document identifier. In another implementation, the value is a hash of the iterated word. In yet another implementation, the value is a cryptographic hash of the iterated word. In yet another implementation, the value is a message authentication code of the iterated word. At block 808, the messaging service generates a new index entry that links the value and the document ID and adds the new index entry to the protected index.

At decision block 810, the messaging service determines whether there are more words to process in the new document. If there are more words to process the new document, execution returns to block 804 and the next word in the document is processed. If there are not more words in the new document to process, execution advances to block 812. At block 812, the protected index has been updated in accordance with the new document, and the updated protected index is stored by the messaging service.

Figure 9:
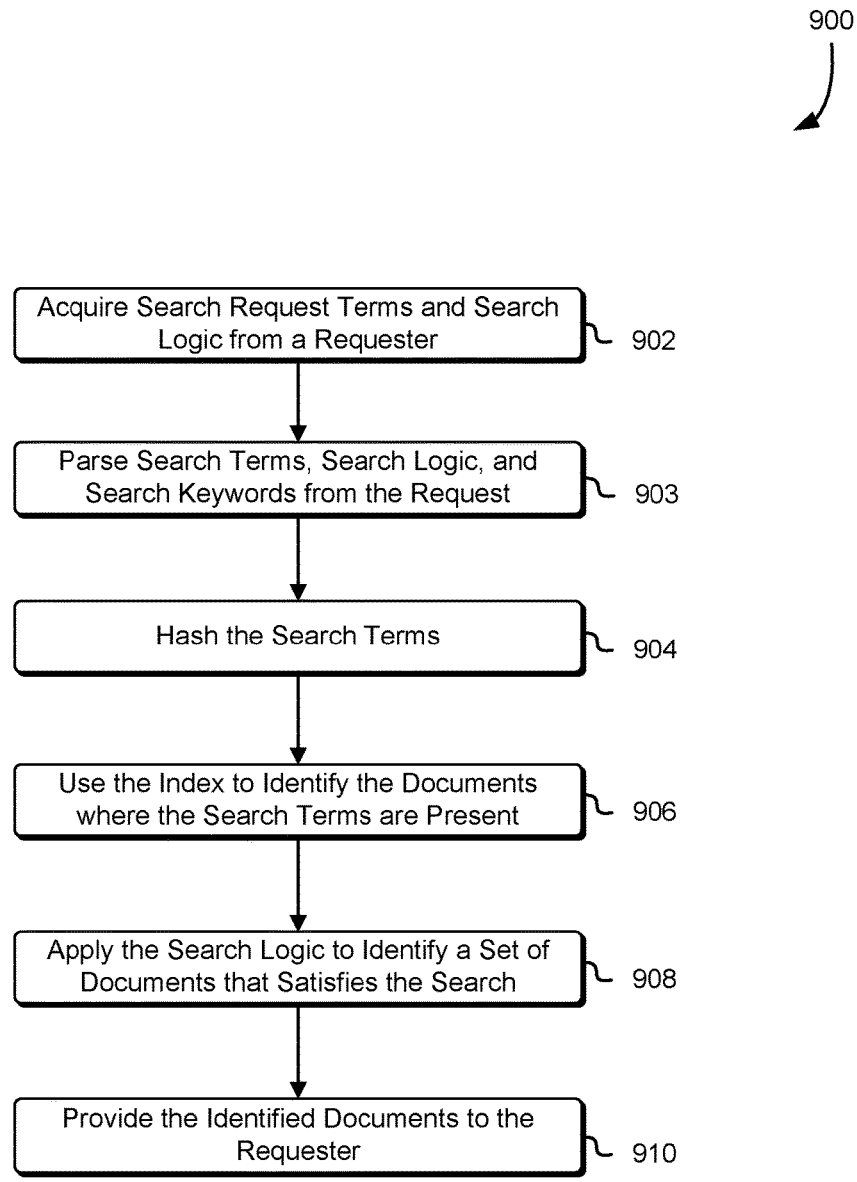
FIG. 9 shows an illustrative example of a process that, as a result of being performed by a messaging service, performs a document search using a protected index.

FIG. 9 shows an illustrative example of a process that, as a result of being performed by a messaging service, performs a document search using a protected index. A flowchart 900 illustrates a process that begins at block 902 with a messaging service acquiring a search request from a user of the messaging service. The search request includes search terms, search logic that links the terms, and keywords that modify the search request. At block 903, the messaging service parses the search request to identify search terms, keywords, and search logic associated with the request. For example, search terms may include words that may be tokenized and indexed in the document being searched. Keywords may include words or word sequences that modify the search such as 'starts with,' near,' or 'from.' Search logic may include logical operators such as 'or' or 'and.' At block 904, the messaging service produces a hash value for each of the search terms in the search request. In some implementations, the hash value of the search term is generated by taking a cryptographic hash of the search term. At block 906, the messaging service uses a protected index to identify a set of documents that match each search term in the search request. For example, for a search request of "A and B," the messaging service identifies a first set of documents that match the term "A" and a second set of documents that match the term "B." At block 908, the messaging service applies the search logic and the search keywords associated with the search request to the sets of documents identified at block 906 to identify a final set of documents that satisfies the search request. In the example recited above, the messaging service determines the intersection of the first set of documents and the second set of documents to produce a final set of documents that are present both in the first set of documents and the second set of documents.

At block 910, the final set of documents is provided to the user. In some implementations, document IDs that correspond to the final set of documents are provided to the user. In another implementation, the messaging service filters the document IDs in the final set of documents to limit the search results to those documents to which the user is allowed access.

Figure 10:
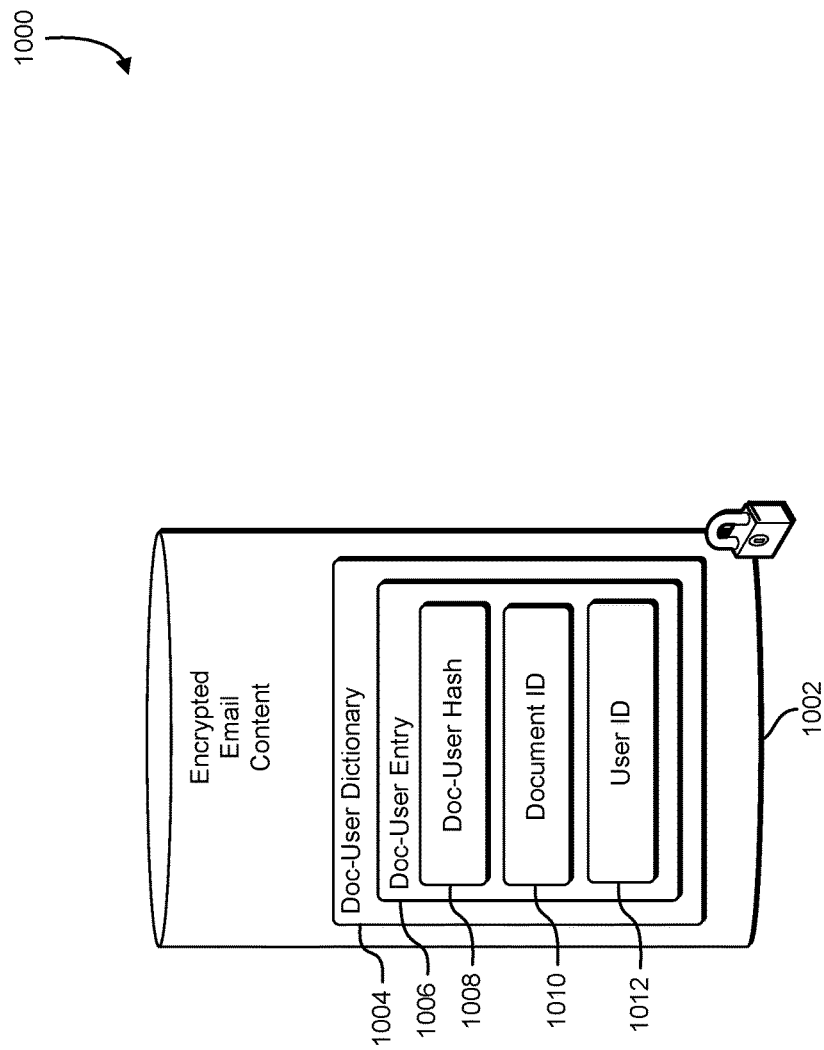
FIG. 10 shows an illustrative example of a data store that retains a dictionary of Doc-User hashes to document IDs and User IDs.

FIG. 10 shows an illustrative example of a data store that retains a dictionary of hashes to document IDs and User IDs. A diagram 1000 shows a data store 1002 that holds a doc-user dictionary 1004. The doc-user dictionary 1004 is a data structure used by the messaging service to translate doc-user hashes into their component document IDs and user IDs. The doc-user dictionary 1004 contains a collection of doc-user entries. The entries may be retained in an ordered list, ordered array, binary tree, or hash table to improve the performance of the doc-user dictionary 1004.

Each entry of the doc-user dictionary 1004 is a doc-user entry. FIG. 10 shows a representative doc-user entry 1006. The representative doc-user entry 1006 includes a doc-user hash 1008, a document ID 1010, and a user ID 1012. When a new document is created, the messaging service generates a document ID for the new document. In various examples, the document ID may be a number, a sequence of bytes, or alphanumeric sequence. The messaging service generates a new doc-user entry record and then stores the document ID and the user ID of the user that created the new document in the new doc-user entry record. The doc-user hash 1008 is created by combining the document ID and the user ID and generating a cryptographic hash of the combination. In some examples, the document ID and user ID are combined by concatenating the document ID and the user ID. In other examples, the document ID and user ID are combined by performing an XOR operation on the document ID with the user ID.

Figure 11:
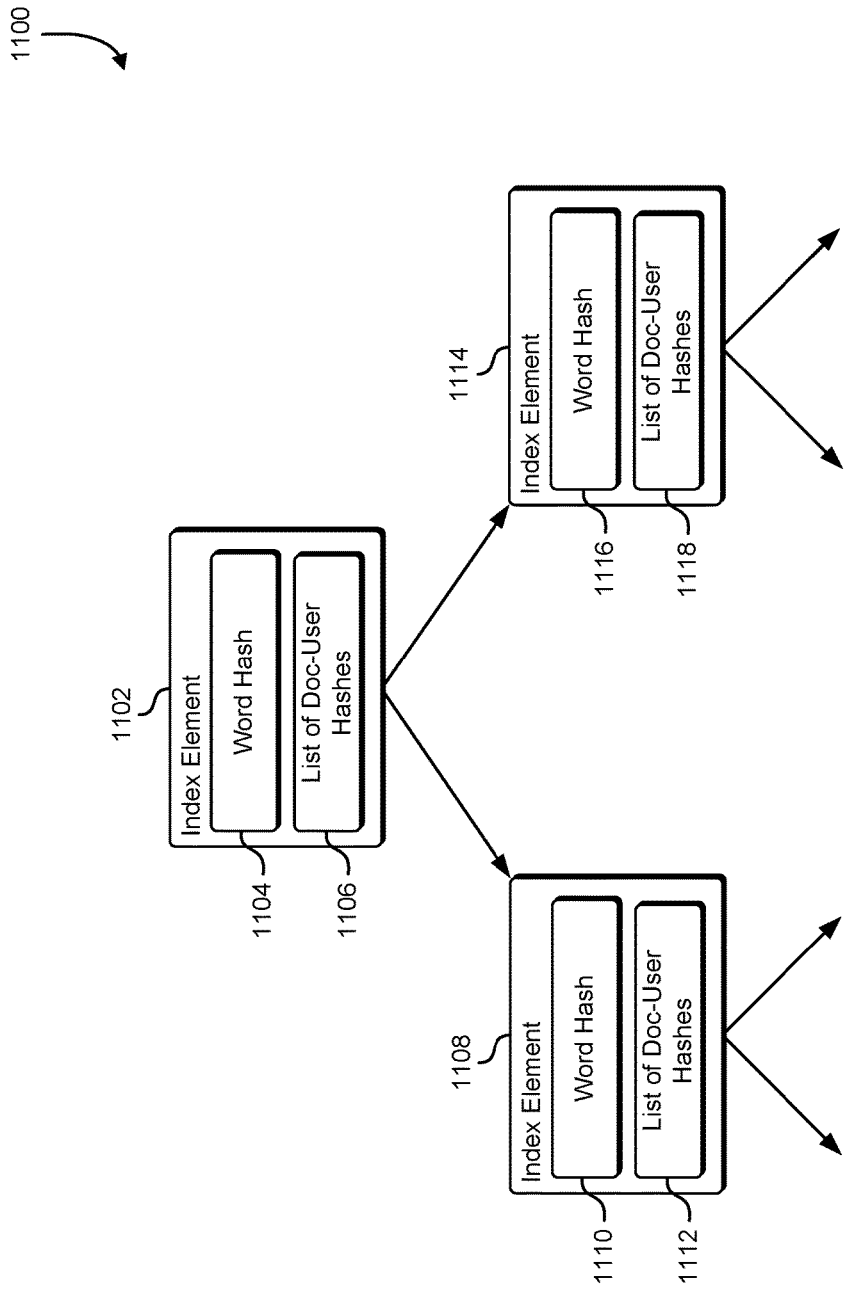
FIG. 11 shows an illustrative example of a protected index that enables isolated searches to be performed on a set of documents.
Figure 12:
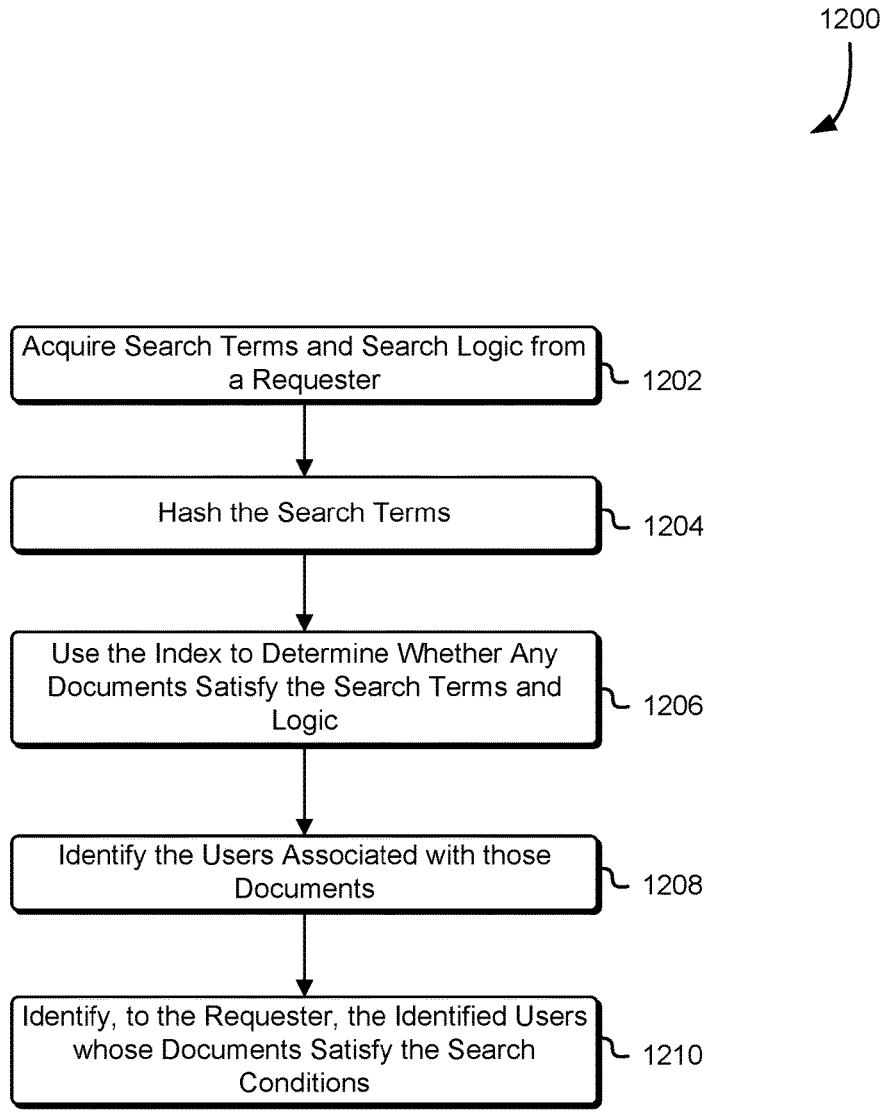
FIG. 12 shows an illustrative example of a process that, as a result of being performed by a messaging service, performs an isolated search on a set of documents.

In various implementations described and shown in FIG. 11 and FIG. 12, when the messaging service performs a search operation on behalf of the user, the resulting search results are a list of doc-user hashes. The messaging service uses the doc-user dictionary 1004 to translate the list of doc-user hashes to a responding set of document IDs and user IDs.

FIG. 11 shows an illustrative example of a protected index that enables isolated searches to be performed on a set of documents. A data diagram 1100 illustrates a structure for a protected index that, in some examples, protects the identity of the particular documents and users when searches are performed. The protected index includes a number of index elements arranged in a binary tree structure. Each index element contains a word hash and a list of doc-user hashes. The word hash is a hash, cryptographic hash, checksum, encrypted value, dictionary value, or message authentication code that represents a word or token of a particular document. A document may be a word processing document, a chat log, a data stream, a source file, an HTML document, or other content. The list of doc-user hashes is a collection of doc-user hashes, where each doc-user hash is a cryptographic hash of a combination of a document ID and user ID. The document ID may be a file ID, a filename, a dictionary value, or other value associated with a particular document. The user ID may be a username, a full username, or other user identifier associated with a particular user. A cryptographic hash may be generated using SHA-1, SHA-2, MD5, BLAKE, or other cryptographic hash function. The index elements of the tree structure are arranged using the word hashes as a key value.

The binary tree structure includes a root index element 1102 that has a root word hash 1104 and a root list of doc-user hashes 1106. The root index element 1102 has two child nodes: a first child index element 1108 having a first word hash 1110 and a first list of doc-user hashes 1112, and a second child index element 1114 having a second word hash 1116 and a second list of doc-user hashes 1118. The binary tree structure may have additional levels as appropriate for the number of index elements in the index. In some implementations, the tree structure has a fanout of greater than two. For example, the tree structure may be arranged with a fanout of three where each intermediate node of the tree structure has three child nodes. In one implementation, a first child node holds index elements whose word hashes are below a lower threshold value, a second child node holds index elements whose word hashes are between the lower threshold value and an upper threshold value, and a third child node holds index elements whose word hashes are above the upper threshold value.

FIG. 12 shows an illustrative example of a process that, as a result of being performed by a messaging service, performs an isolated search on a set of documents. A flowchart 1200 illustrates a process that begins at block 1202 with a messaging service receiving a search request from a requester. The search request includes one or more search terms and search logic that defines a logical relationship between the one or more search terms. In some implementations, the requester is a third party that is not associated with the documents being searched or the messaging service. At block 1204, the messaging service tokenizes the search request to extract the search terms and then generates a hash for each of the search terms. In some implementations, the hash is a cryptographic hash. In other implementations, the hash is a value extracted from a dictionary maintained by the messaging service.

At block 1206, the messaging service uses a protected index similar to the protected index illustrated in FIG. 11 to determine whether any documents represented in the protected index satisfy the search terms and logic of the search request. In some implementations, the messaging service identifies a set of documents for each term of the search request and then applies the search logic to the sets of documents to determine a final set of documents that satisfies the logic of the search request. If at least one document represented in the protected index satisfies the terms and logic of the search request, the messaging service retrieves a set of doc-user hashes corresponding to the documents that satisfy the terms and logic of the search request.

At block 1208, the messaging service uses a doc-user dictionary to convert each doc-user hash to a document ID and user ID. In some implementations, the messaging service limits access to the doc-user dictionary based on the identity of the requester. For example, an advertiser may pay for a limited number of user IDs that match a particular search. In response, the messaging service converts the limited number of doc-user hashes to user IDs. In another example, the requester may be provided with the number of documents that satisfies the search request. In yet another example, the requester may be provided with an indication of how many different users own documents that satisfy the search request. At block 1210, the messaging service provides, to the requester, information that identifies the users and the documents that satisfy the search conditions. In some examples, the messaging service provides information that identifies the documents that satisfy the search conditions, and the requester is able to access information that identifies the owner of the documents.

Figure 13:
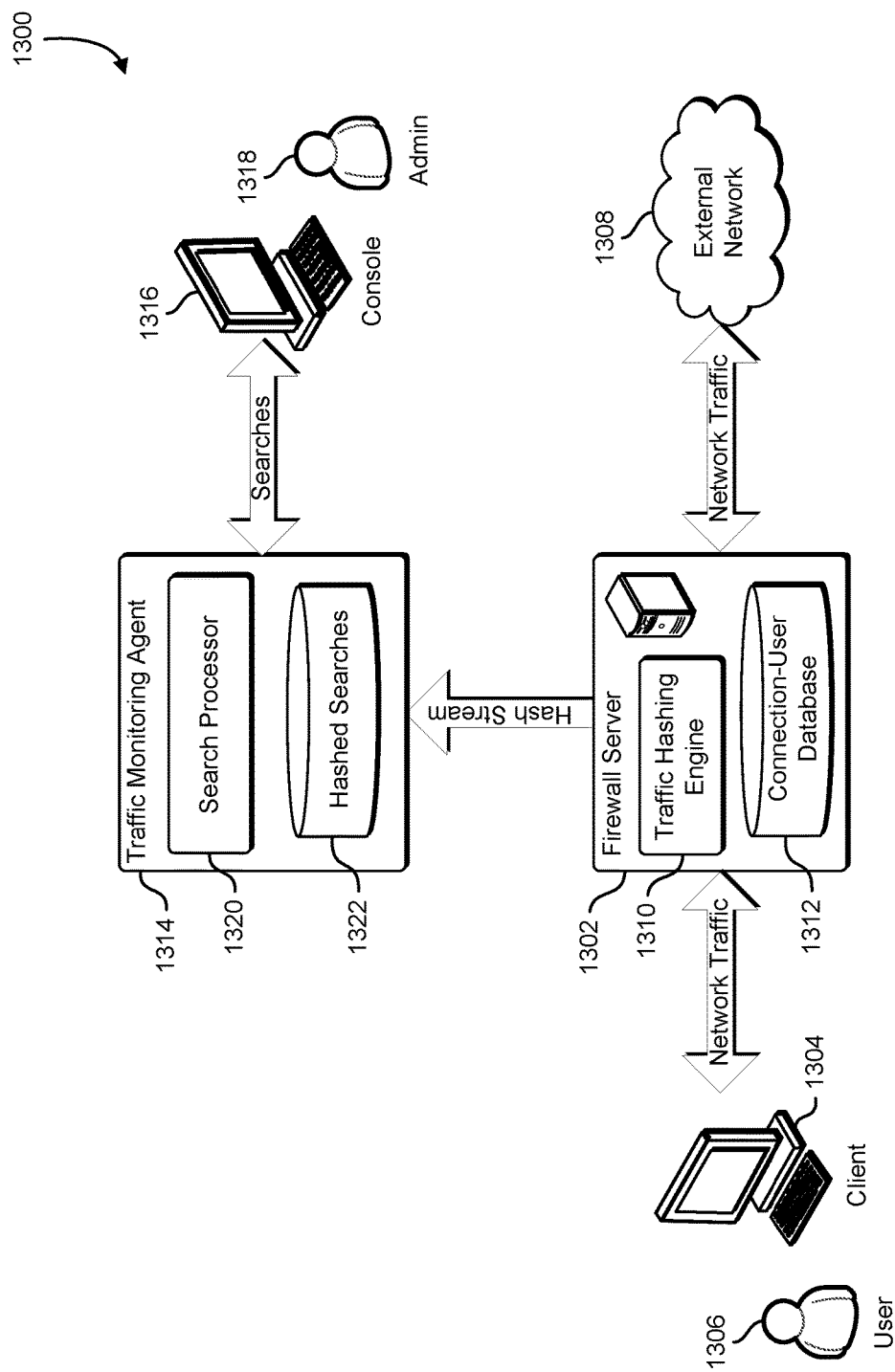
FIG. 13 shows an illustrative example of a system that monitors network traffic for traffic that matches one or more sets of search terms and parameters.

FIG. 13 shows an illustrative example of a system that monitors network traffic for traffic that matches one or more sets of search terms and parameters. A system diagram 1300 shows a firewall server 1302 that monitors network traffic exchanged between a client computer system 1304 operated by a user 1306 and an external network 1308. The client computer system 1304 may be a personal computer, notebook computer, a cellular device, a tablet computer, a network-connected appliance, or other device capable of being connected to a computer network. In various implementations, the firewall server 1302 may be a network firewall server, network proxy, or network router that provides search functions for network traffic that traverses the device. In various implementations, the external network 1308 may be a subnetwork within a company, a wide-area network, or the Internet.

The firewall server 1302 includes a traffic hashing engine 1310 and a connection-user database 1312. The firewall server 1302 routes logical connections between the client computer system 1304 and the external network 1308, and maintains information relating to each logical connection in the connection-user database 1312. The connection-user database 1312 identifies a particular user that is associated with each connection. The traffic hashing engine 1310 is a service that runs on the firewall server 1302. The firewall server 1302 provides a copy of network traffic transmitted over each stream to the traffic hashing engine 1310. The traffic hashing engine 1310 tokenizes the network traffic of each stream to produce a sequence of tokens. In some implementations, the tokens correspond to words of a transmitted document. In another implementation, the tokens correspond to HTML tags. In yet another implementation, the tokens correspond to comma-separated data values that are transmitted over a network connection. The traffic hashing engine 1310 generates a hash value for each token, and sends the resulting stream of hash values to a traffic monitoring agent 1314 together with an associated connection identifier.

The traffic monitoring agent 1314 is a service operated by an administrator 1318 using an administrative console 1316. The administrator 1318 configures the traffic monitoring agent 1314 by submitting search requests to the traffic monitoring agent 1314. The traffic monitoring agent 1314 includes a search processor 1320 and a database of hashed searches 1322. The search processor 1320 parses the search request submitted by the administrator 1318 into a set of search terms and search logic. The search terms are hashed and stored in the database of hashed searches 1322 together with their corresponding search logic.

As hash streams are received by the traffic monitoring agent 1314, the traffic monitoring agent 1314 examines the incoming hash streams to determine whether each stream matches any of the searches retained in the database of hashed searches 1322. If the traffic monitoring agent 1314 identifies a hashed search that matches an incoming hash stream, the traffic monitoring agent 1314 notifies the administrator 1318 via the administrator console 1316. In various examples, the traffic monitoring agent 1314 is operated by different entities in the firewall server 1302. Privacy of the user 1306 is protected because a hash stream is provided to the traffic monitoring agent 1314 instead of the associated plaintext. Confidentiality of the searches performed by the administrator 1318 is protected because only the hashed searches are retained on the traffic monitoring agent 1314.

Figure 14:
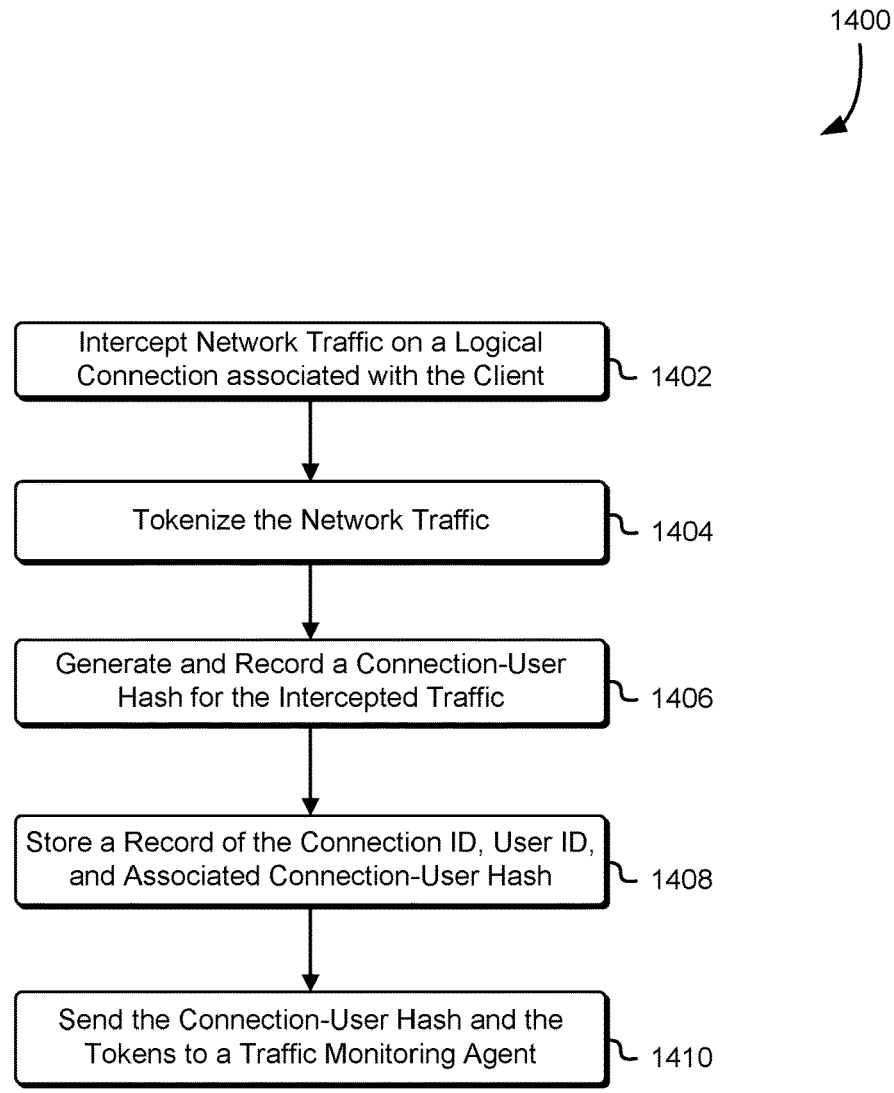
FIG. 14 shows an illustrative example of a process that, as a result of being performed by a firewall server, provides a stream of tokens that represents network traffic to a traffic monitoring agent.

FIG. 14 shows an illustrative example of a process that, as a result of being performed by a firewall server, provides a stream of tokens that represents network traffic to a traffic monitoring agent. A flowchart 1400 illustrates a process that begins at block 1402 with a firewall server intercepting network traffic between a client computer system and an external network. The network traffic is associated with a logical network connection that is associated with a particular user. The firewall server tokenizes 1404 the network traffic to produce a series of tokens. In some implementations, the tokens are words, HTML tags, elements of an HTML document, or other searchable content. In some implementations, the firewall server implements a tokenizing algorithm that is dependent on the network port over which the network traffic is intercepted. For example, network traffic that is intercepted on a network port associated with a website may be tokenized into HTML tags or elements of an HTML document. Traffic that is intercepted on a telnet port may be tokenized into a series of words delimited by whitespace.

At block 1406, the firewall server converts the tokens of each intercepted network connection into a corresponding set of hashes. Each a set of hashes is stored 1408 in association with a connection identifier that identifies the connection and a user identifier that identifies the user that initiated the connection. At block 1410, the firewall server sends each set of hashes together with information identifying the connection associated with the hashes to a traffic monitoring agent. In various implementations, the traffic monitoring agent may be a service running on the firewall server or a service running on a separate server apart from the firewall server.

Figure 15:
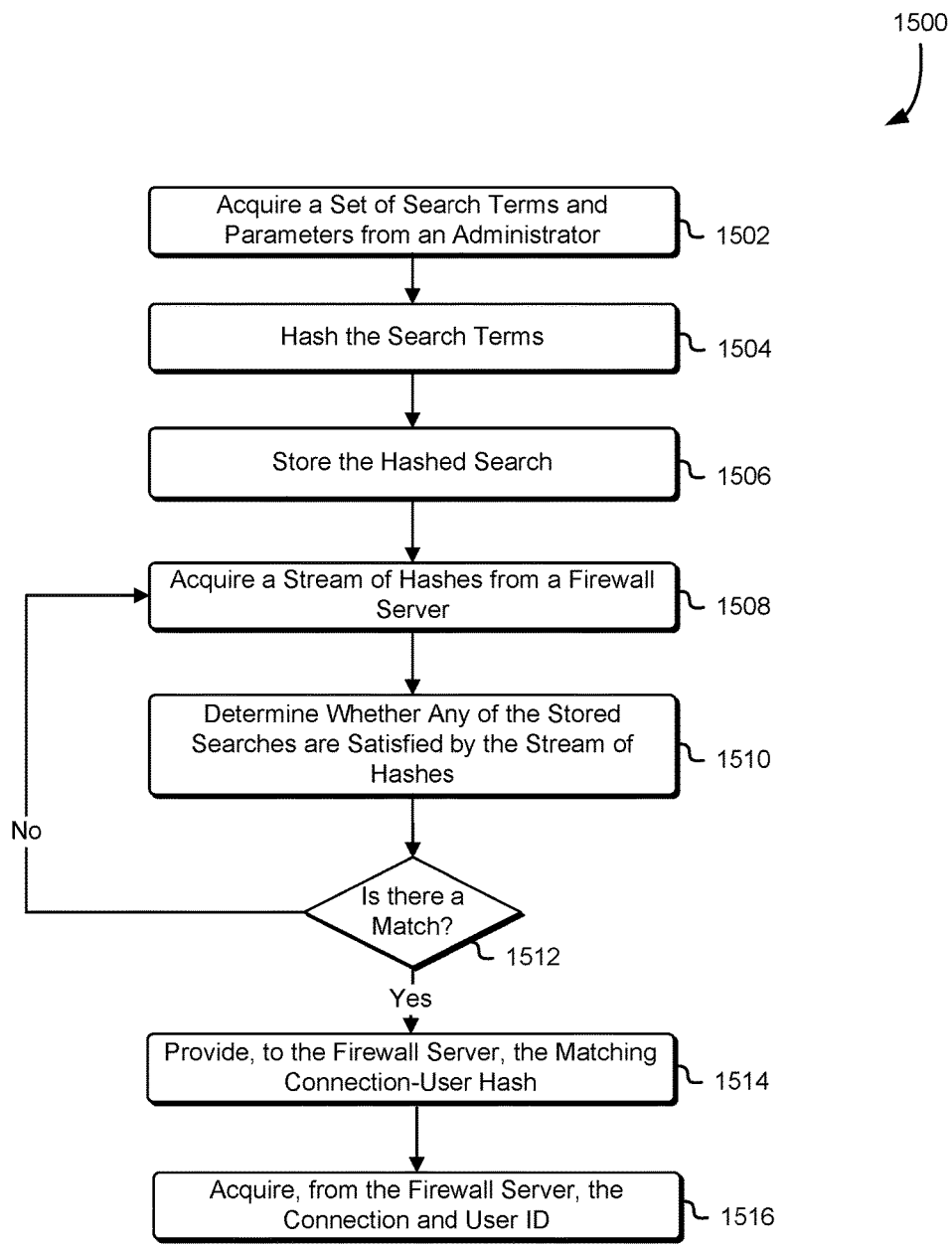
FIG. 15 shows an illustrative example of a process that, as a result of being performed by a traffic monitoring agent, determines whether a stream of tokens matches one or more sets of search terms and parameters.

FIG. 15 shows an illustrative example of a process that, as a result of being performed by a traffic monitoring agent, determines whether a stream of tokens matches one or more sets of search terms and parameters. A flowchart 1500 illustrates a process that begins at block 1502 with a traffic monitoring agent acquiring a set of search terms and parameters from an administrator. The traffic monitoring agent is a service running on a computer system that receives streams of hashes associated with network traffic monitored by a network firewall. At block 1504, the traffic monitoring agent generates a cryptographic hash for each of the search terms. In various implementations, the cryptographic hashes may be generated using a cryptographic hash function, an encryption algorithm, or message authentication code. The hashed search terms are stored 1506 in association with the search logic linking the search terms to each other.

At block 1508, the traffic monitoring agent initiates a loop that processes hash streams received from the firewall server. At block 1508, the traffic monitoring agent receives a stream of hashes representing a monitored stream of network traffic from the firewall server. The traffic monitoring agent also receives information that identifies a logical network connection and a user that are associated with the monitored stream of network traffic. At block 1510, the traffic monitoring agent determines whether the stream of hashes received from the network firewall satisfies the search terms and parameters provided by the administrator. The hashes received from the network firewall and the hashing performed on the search terms at block 1504 are performed using matching algorithms to facilitate evaluation of the search request. If the traffic monitoring agent determines that the search request submitted by the administrator does not match 1512 the received stream of hashes, execution returns to block 1508 and an additional stream of hashes is received from the firewall server. If the traffic monitoring agent determines that the search request submitted by the administrator does match 1512 the received stream of hashes, execution advances to block 1514.

At block 1514, the traffic monitoring agent provides, to the firewall server, information identifying the connection and user associated with the matching stream of hashes. In some implementations, the information is a connection-user hash. A connection-user hash may be generated by combining a connection ID and user ID and taking a cryptographic hash of the combination. In some implementations, the connection ID and user ID are concatenated to produce the combination. The firewall server implements authentication and authorization protocols that determine whether the traffic monitoring agent is granted access to the connection ID and user ID information. If the firewall server determines that the traffic monitoring agent is authorized to receive the connection ID and user ID information, then the firewall server, at block 1516, acquires the connection ID and user ID information from the firewall server for the matching stream of hashes.

Certain embodiments of the system described and shown in FIG. 13 through FIG. 15 may be used to facilitate monitoring of network traffic that respects the privacy of users by providing hashes of the network traffic. In addition, searching authorities may provide hashed searches to a traffic-monitoring agency without revealing the specific terms for which they are looking. In this way, the privacy of users is respected, and the security of search authorities is also protected.

Figure 16:
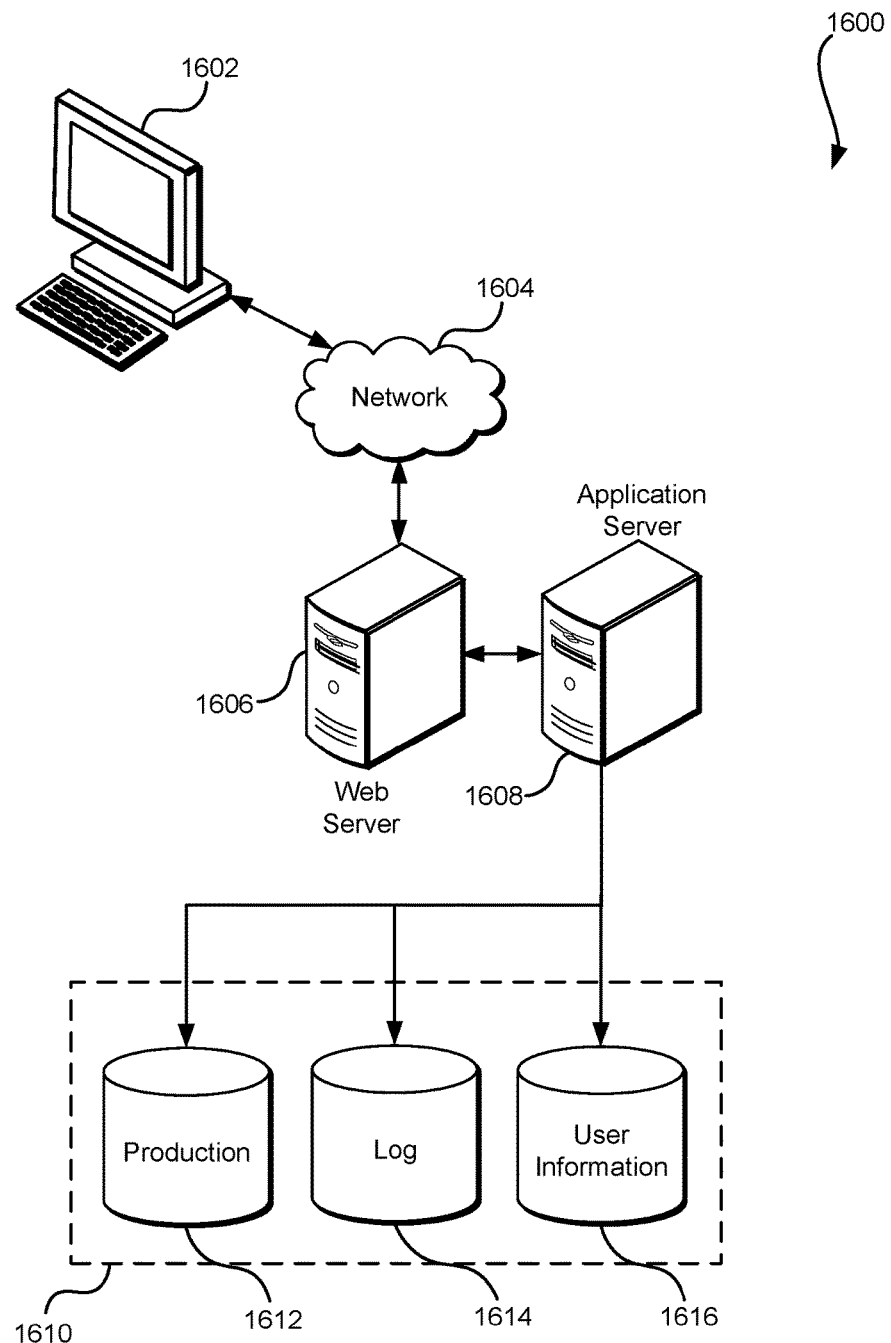
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes, and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   intercepting, at a network firewall, a network stream between a client device and an external network;
   processing the network stream into a set of tokens that are present in the network stream, the set of tokens separated by one or more delimiters;
   producing a set of values by applying a transformation to a first subset of tokens of the set of tokens, where the transformation, when applied to a token of the set of tokens, produces a representative value;
   obtaining a search request, the search request including a search term and a request for user information;
   applying the transformation to the search term to produce a set of search values;
   generating a determination that the network stream satisfies the search request based at least in part on a result of comparing the set of search values to the set of values; and
   providing the determination and user information associated with the network stream to an administrative console.

2. The computer-implemented method of claim 1, further comprising:
   identifying a destination network port to which the network stream is addressed; and
   processing the network stream into a set of tokens based at least in part on the destination network port.

3. The computer-implemented method of claim 1, further comprising:
   identifying a plurality of sets of network streams by identifying a set of network streams for individual search terms in the search request; and
   determining a final set of network streams that satisfies the search request by at least applying search logic included with the search request to the plurality of sets of network streams.

4. The computer-implemented method of claim 1, wherein producing a set of values is accomplished at least in part by determining a cryptographic hash of individual tokens in the set of tokens.

5. A system, comprising:
   one or more processors; and
   memory retaining computer-executable instructions that, if executed, cause the system to:
      convert a token in a set of token sets to a corresponding hash value to produce a set of hashed token sets that represent a set of data streams;
      store information associating individual hashed token sets in the set of hashed token sets with a data stream in the set of data streams;
      obtain a set of hashed search terms and an associated set of search logic;

identify, from the set of data streams, a data stream that includes at least one hashed search term of the set of hashed search terms in accordance with the associated set of search logic by at least comparing a first portion of the set of hashed search terms to a second portion of the set of hashed token sets;

receive, from an entity, a request to identify a user associated with the data stream that includes the at least one hashed search term in accordance with the associated set of search logic;

determine that the entity is authorized to perform a search; and as a result of having determined that the entity is authorized, identify a user associated with the data stream.

6. The system of claim 5, wherein converting individual tokens in the set of token sets to the corresponding hash value is accomplished by at least determining a cryptographic hash of individual tokens in the set of token sets.

7. The system of claim 5, wherein converting individual tokens in the set of token sets to the corresponding hash value is accomplished by at least encrypting individual tokens in the set of token sets with a cryptographic key.

8. The system of claim 5, wherein:
the memory retaining computer-executable instructions further causes the one or more processors to tokenize individual data streams of the set of data streams into a set of tokens to produce the set of token sets;
tokenizing individual data streams in the set of data streams is accomplished by parsing individual data streams into a corresponding sequence of words separated by whitespace characters; and
whitespace characters include space, punctuation, carriage return, and line feed characters.

9. The system of claim 5, wherein:
a particular data stream in the set of data streams is transmitted over a logical network connection between a client computer system and an external network through a network router; and
the system stores information that associates a user of the client computer system with the particular data stream.

10. The system of claim 5, wherein:
a particular data stream in the set of data streams includes HTML information streamed over a network connection; and
tokenizing the particular data stream is accomplished at least by separating the HTML information into a corresponding set of HTML tags.

11. The system of claim 5, wherein the data stream that includes the search terms in accordance with the search logic is determined in part by:
applying an OR operation represented in the associated set of search logic by determining a union between two sets of hashed token sets; and
applying an AND operation represented in the associated set of search logic by determining an intersection between two sets of hashed token sets.

12. The system of claim 5, wherein the memory retaining computer-executable instructions that cause the one or more processors to determine that the entity is authorized to perform the search further causes the one or more processors to determine that the entity is authorized based at least in part on identifying that the entity provided the search from an administrator console.

13. A non-transitory computer-readable storage medium having stored thereon executable instructions that, as a result of being executed by one or more processors of a computer system, cause the computer system to at least:
obtain a search request from a requester, the search request containing at least one search term, where the requester is authorized to perform the search request;
determine a cryptographic hash of the search term;
obtain a set of hashes that represent a data stream, individual hashes in the set of hashes being a cryptographic hash of a different portion of the data stream;
determine that a portion of the data stream matches the search term by at least determining that at least one hash in the set of hashes matches the cryptographic hash of the search term
obtain, from an administrator console, an identification request associated with the data stream; and
provide identifying information associated with the data stream to the administrator console.

14. The non-transitory computer-readable storage medium of claim 13, wherein the instructions further comprise instructions that, as a result of being executed by the one or more processors, cause the computer system to:
obtain information that identifies a user that is associated with the data stream; and
provide the information to the requester.

15. The non-transitory computer-readable storage medium of claim 13, wherein:
the set of hashes are received from a network firewall server; and
the data stream is a stream of data sent over a logical connection that traverses the network firewall server.

16. The non-transitory computer-readable storage medium of claim 13, wherein:
the search request includes an additional search term;
the search request specifies that a logical AND operation be performed between the search term and the additional search term; and
the instructions further include instructions that cause the computer system to:
determine an additional cryptographic hash from the additional search term; and
determine that the search request is satisfied by at least determining that a different portion of the data stream matches the additional search term by at least determining that at least one hash in the set of hashes matches the additional cryptographic hash.

17. The non-transitory computer-readable storage medium of claim 13, wherein:
the search request includes an additional search term;
the search request specifies that logical OR operation to be performed between the search term and the additional search term; and
the instructions further include instructions that cause the computer system to:
determine an additional cryptographic hash from the additional search term; and
determine that the search request is satisfied by at least determining that either a different portion of the data stream matches the additional search term by at least determining that at least one hash in the set of hashes matches the additional cryptographic hash or determining that the portion of the data stream matches the search term.

18. The non-transitory computer-readable storage medium of claim 13, wherein:
the search request specifies that a logical NOT operation be performed with respect to the search term; and the instructions further include instructions that cause the computer system to determine that the search request is satisfied by at least determining that no portion of the data stream matches the search term.

19. The non-transitory computer-readable storage medium of claim 13, wherein the instructions further comprise instructions that, as a result of being executed by the one or more processors, cause the computer system to:
   obtain the data stream; and
   provide the data stream to the requester.

20. The non-transitory computer-readable storage medium of claim 13, wherein the cryptographic hash is generated with a SHA-1, SHA-2, MD5, or BLAKE hashing function.

* * * * *